United States Patent [19]

Mogamiya

[11] Patent Number: 5,640,278
[45] Date of Patent: Jun. 17, 1997

[54] FEED SCREW MECHANISM WITH LINEAR MOVEMENT AND ROTATION ADJUSTING MEANS

[75] Inventor: Makoto Mogamiya, Tokyo, Japan

[73] Assignee: Asahi Kogaku Kogyo Kabushiki Kaisha, Tokyo, Japan

[21] Appl. No.: 299,895

[22] Filed: Sep. 1, 1994

[30] Foreign Application Priority Data

Sep. 1, 1993 [JP] Japan ................................. 5-047571
Sep. 6, 1993 [JP] Japan ................................. 5-220934

[51] Int. Cl.$^6$ ........................................ G02B 7/02
[52] U.S. Cl. ............................... 359/822; 359/823
[58] Field of Search ................................. 359/822, 825, 359/826, 823, 694; 355/58, 59

[56] References Cited

U.S. PATENT DOCUMENTS

| | | | |
|---|---|---|---|
| 895,968 | 8/1908 | Cook | 355/59 |
| 2,693,736 | 11/1954 | Schumacher | 355/58 |
| 2,704,484 | 3/1955 | Schwesinger | 355/58 |
| 2,727,431 | 12/1955 | Blatherwick | 355/59 |
| 2,988,749 | 9/1961 | Oji | 355/58 |
| 4,048,641 | 9/1977 | Cieplik | 354/10 |
| 4,107,714 | 8/1978 | Raab | 354/196 |
| 4,142,793 | 3/1979 | Schilling | 355/58 |
| 4,346,984 | 8/1982 | Kingsley | 355/8 |
| 4,397,544 | 8/1983 | Yajima | 355/58 |
| 4,459,017 | 7/1984 | Miura | 355/58 |
| 4,555,165 | 11/1985 | Negoro | 359/695 |

FOREIGN PATENT DOCUMENTS 61-130939 6/1986 Japan ................................. 355/58

Primary Examiner—Georgia Y. Epps
Assistant Examiner—Ricky Mack
Attorney, Agent, or Firm—Kane, Dalsimer, Sullivan, Kurucz, Levy, Eisele and Richard, LLP

[57] ABSTRACT

A feed screw mechanism includes a linearly movable member which supports a pin and a lead screw which rotates while being in mesh with the pin, so that the rotation of the lead screw causes the linearly movable member to linearly move. The linearly movable member includes a linear movement adjusting device which adjustably supports the pin in a direction perpendicular to an axis of the lead screw, a rotation adjusting device which rotatably supports the pin in a plane including the pin, and a locking member which locks the pin is a predetermined position.

21 Claims, 9 Drawing Sheets

FEED SCREW MECHANISM WITH LINEAR MOVEMENT AND ROTATION ADJUSTING MEANS

BACKGROUND OF THE INVENTION

1. Field of the Invention

The present invention relates to a feed screw mechanism in which a rotation of a lead screw is converted in to a linear movement.

2. Description of Related Art

In an application of such a feed screw mechanism, for example, to a camera, the lead screw is engaged by a pin which is connected to a lens groups of the camera, so that the rotation of the lead screw causes the lens groups to move in the optical axis direction thereof to carry out a predetermined operation, such as zooming, etc.

In such a known feed screw mechanism, if the lead screw fails to correctly engage with the pin, a possible oscillation or shock applied to the camera causes the pin to skip over the correct tooth of the lead screw to be engaged, thus resulting in an error in the engagement. This makes it impossible to move the lens groups by the correct distance in the optical axis direction.

Moreover, if a camera in which the feed screw mechanism is incorporated is provided with a pair of lens groups which are driven by the respective lead screws, it is necessary to provide a pair of separate lens driving mechanisms including lead screws. This not only increases the number of camera components, but also complicates the camera design in view of a difficulty in matching components.

SUMMARY OF THE INVENTION

The primary object of the present invention is to provide a feed screw mechanism in which the pin can be always correctly and easily engaged by the lead screw.

To achieve the object mentioned above, according to the present invention, there is provided a feed screw mechanism including a linearly movable member which supports a pin and a lead screw which rotates while being in mesh with the pin, so that the rotation of the lead screw causes the linearly movable member to linearly move, wherein the linearly movable member comprises a linear movement adjusting means for adjustably supporting the pin in a direction perpendicular to an axis of the lead screw, a rotation adjusting means for rotatably supporting the pin in the same plane, and a locking means for locking the pin at a predetermined position.

In an embodiment of the present invention, the linear movement adjusting means comprises a pin supporting plate supported on the linearly movable member to support the pin. The pin supporting plate can be provided with a pair of screw insertion holes. Preferably, the locking means comprises mounting screws which can be inserted in the screw insertion holes of the pin supporting plate.

The linearly movable member can be comprised of a supporting portion. The pin supporting plate is provided with a reference surface against which the supporting portion of the linearly movable member abuts, and a movable raised portion whose height from the reference surface can be varied by the moving of the raised portion, so that the pin can be held in position by the top of the raised portion.

Preferably, the screw insertion holes have a width larger than the diameter of the threaded portions of the mounting screws and smaller than the diameter of head portions of the mounting screws, so that the reference surface can be displaced when the raised portion is moved to vary the height thereof with respect to the reference surface.

The mounting screws constitute the linear movement adjusting means together with the pin supporting plate, so that when the mounting screws inserted in to the screw insertion holes are loosened, the needle can be moved in a direction perpendicular to the axis of the lead screw, and when the mounting screws are fastened, the needle can be locked at an adjusted position.

The rotation adjusting means can be comprised of a pin supporting plate supported on and by the linearly movable member to support the pin. The needle supporting plate is provided with a pair of curved slots arranged in a rotation-symmetry and having centers located at the center of the rotation-symmetry.

Preferably, the locking means comprises mounting screws which are inserted in the curved slot. The pin supporting plate supports the pin in the vicinity of the center of rotation symmetry, so that when the pin supporting plate rotates about the center of rotation symmetry, the pin is rotated within a plane to thereby adjust the angle of engagement between the pin and the lead angle of the lead screw.

Another object of the present invention is to provide a simple feed screw mechanism having less number of components than conventional mechanisms.

Still another object of the present invention is to provide a feed screw mechanism in which lens groups, etc., can be moved more accurately without reducing the pitch of the screw, per se.

To this end, according to another aspect of the present invention, there is provided a feed screw mechanism comprising; a first screw shaft, including a pair of male screw portions at different positions in the axial direction thereof; a second screw shaft, which can be axially screw-engaged by one of the male screw portions of the first screw shaft and which is provided on the outer peripheral surface thereof with a male screw portion; linearly movable members which are respectively engaged by the first and second screw shafts and which are independently and linearly moved by the rotation of the respective screw shafts; and a drive means for respectively rotating the first and second screw shafts.

Preferably, the male screw portions of the first screw shaft have different diameters of screws, and the second screw shaft is engaged by the small diameter screw. Preferably, the male screw portions of the first screw shaft have different thread directions.

In an embodiment of the present invention, the pitch of the small diameter screw of the first screw shaft is larger than the pitch of the male screw portion of the second screw shaft, so that when the second screw shaft is rotated in a direction opposite to the direction of the rotation of the small diameter screw of the first screw shaft, the linearly movable member that engages with the second screw shaft, can be moved at a pitch which is different from the pitch of the small diameter screw of the first screw shaft.

The second screw shaft can be provided with a threaded axial hole in which the male screw portion of the first screw shaft is screw-engaged. Also, the second screw shaft can be provided with an axial hole with a cross threadedhole in which an engaging screw is screw-engaged to project into the axial hole to thereby engage with the male screw portion of the first screw shaft.

The present disclosure relates to subjecty matter contained in Japanese Utility Model Application No. 5-47571 (filed on Sep. 1, 1993) and Japanese Patent Application No. 5-220934 (filed on Sep. 6, 1993) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
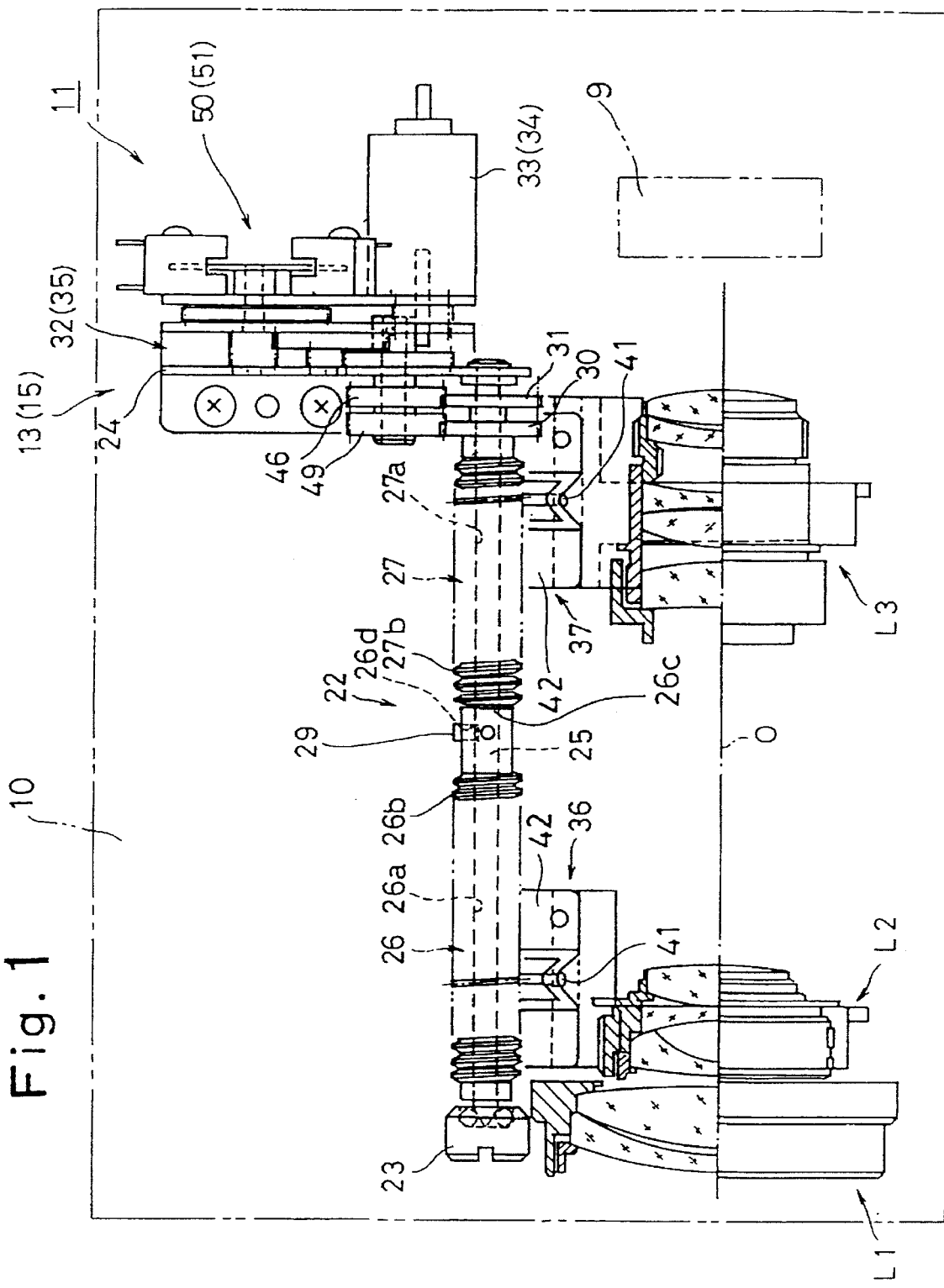
FIG. 1 is a plan view of main components of a camera to which a feed screw mechanism is applied, according to a first embodiment of the present invention.
Figure 2:
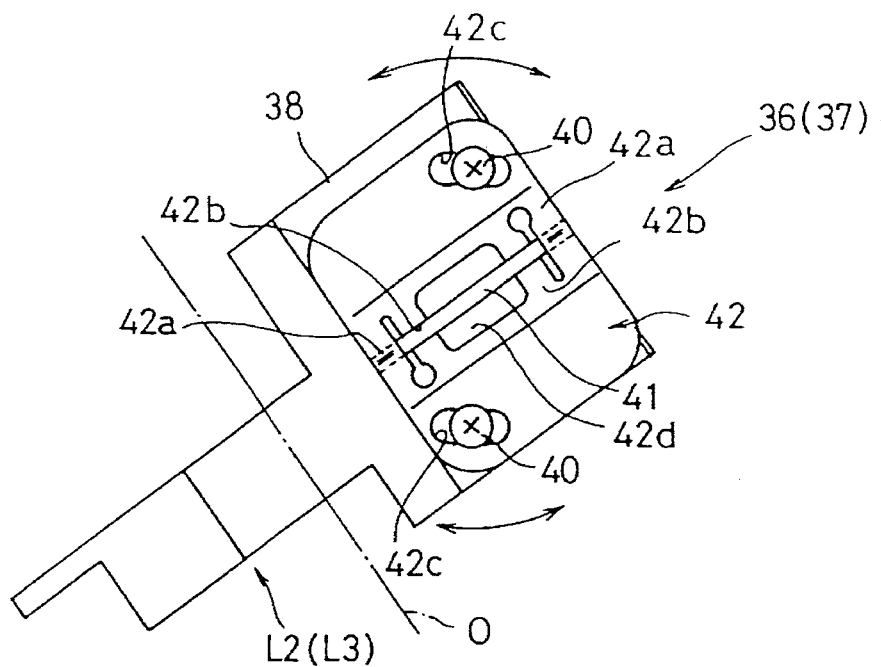
FIG. 2 is a plan view of a linearly movable member of a feed screw mechanism and a needle supporting plate in a feed screw mechanism shown in FIG. 1.
Figure 3:
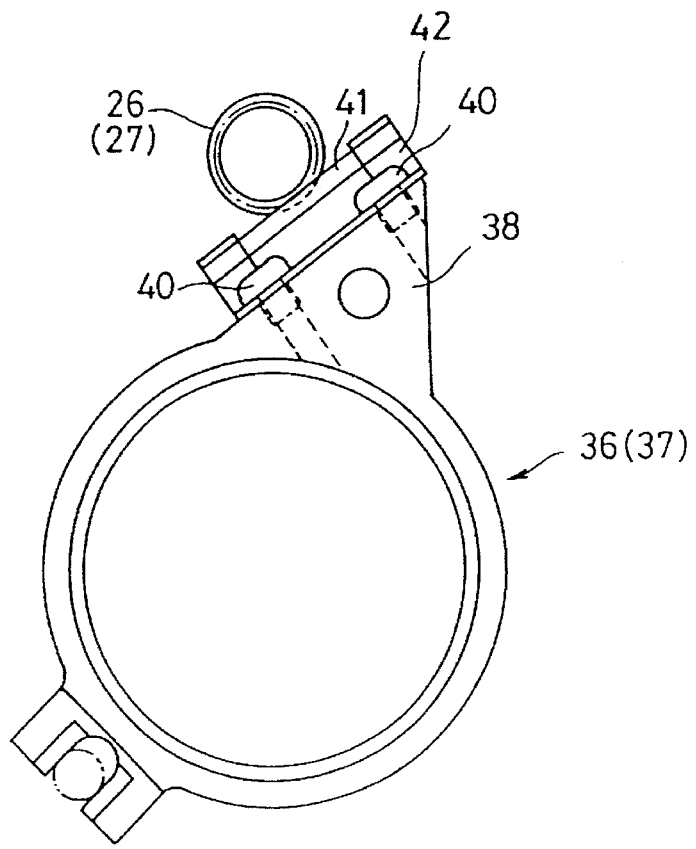
FIG. 3 is a side elevational view of FIG. 2.
Figure 4:
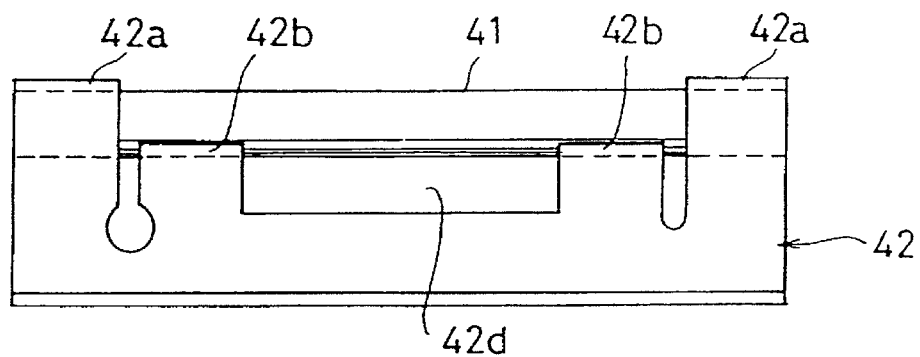
FIG. 4 is a side elevational view of a pin supporting plate on which a pin is held.
Figure 5:
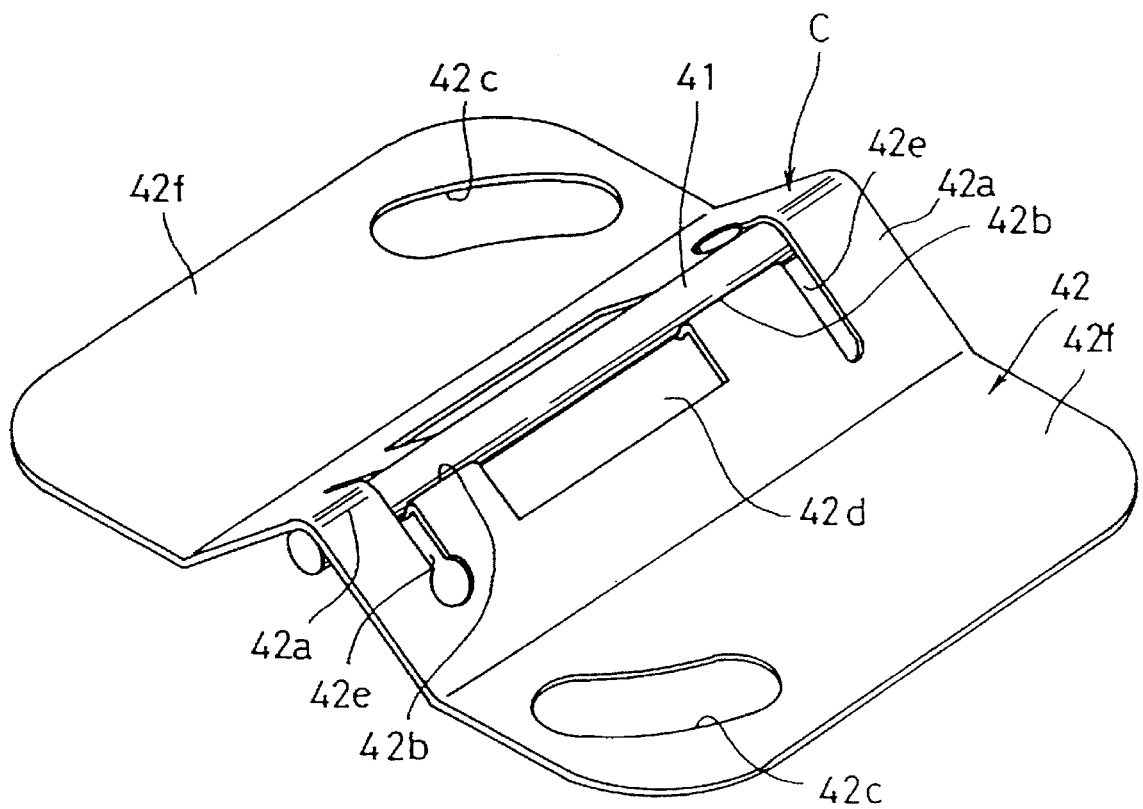
FIG. 5 is a isometric view of a pin supporting plate on which a pin is held.
Figure 6:
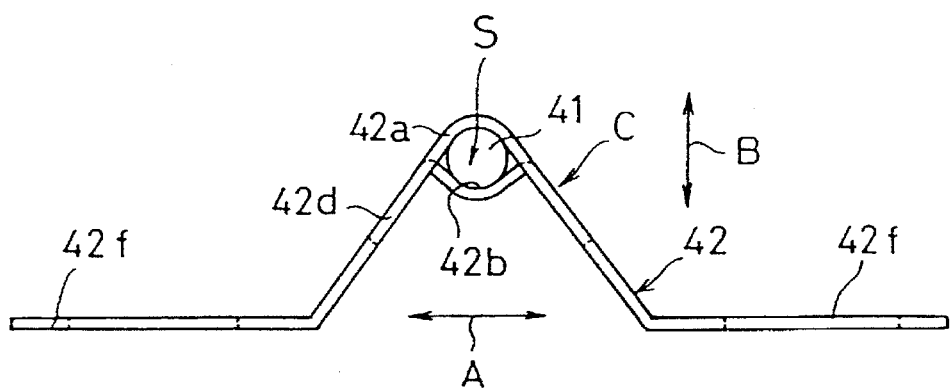
FIG. 6 is a front elevational view of a pin supporting plate on which a pin is held.

FIGS. 1 and 2 show a first embodiment of a feed screw mechanism and the main components of a camera to which the feed screw mechanism is applied.

The camera 11 is provided with a first lens group L1, a second lens group L2, and a third lens group L3, on a base 10. The first lens group L1 is secured to the base 10. The second and third lens groups L2 and L3 are supported to move in the direction of the optical axis O while keeping a predetermined relationship therebetween, so that a zooming operation can be carried out by the relative movement of the second and third lens groups L2 and L3. The second lens group L2 is moved in the optical axis direction to effect the focusing after the zooming operation is complete. The base 10 is provided thereon with a second lens driving unit 13 which moves the second lens group L2 in the optical axis direction O, a third lens driving unit 15 which moves the third lens group L3 in the optical axis direction O, and a light receiving portion 9, such as a CCD, on which light transmitted through the first, second and third lens groups L1, L2 and L3 is made incident.

The feed screw mechanism is also provided, on the base 10, with a lead screw 22 extending in parallel with the optical axis O, pins 41 which are engaged by the lead screw 22, and linearly movable members 36 and 37 which respectively support the second and third lens groups L2 and L3. The feed screw mechanism converts the rotational movement of the lead screw 22 to a linear movement through the pins 41 to move the second and third lens groups L2 and L3 in the optical axis direction.

The lead screw 22 has a core shaft 25 which is rotatably supported at the front and rear ends thereof, by a supporting member 23 and a driving unit mounting plate 24, and a pair of first and second screw shafts 26 and 27. The first and second screw shafts 26 and 27 are provided on the outer peripheral surfaces thereof, with threaded portions (male screw portions) 26b and 27b that are in mesh with pins 41 which are in turn connected to the second and third lens groups L2 and L3, respectively. The rotation of the screw shafts 26 and 27 causes the pins 41, and accordingly, the second and third lens groups L2 and L3 to move in the optical axis direction O.

The first and second screw shafts 26 and 27 are provided with axial bores 26a and 27a in which the core shaft 25 is inserted, so that the screw shafts 26 and 27 are aligned along and on the axis of the core shaft 25. The first screw shaft 26 is provided with a male screw portion 26b and a head portion 26c having no threaded portion thereon. The head portion 26c is provided with a threaded cross hole 26d extending in a radial direction normal to the axis thereof, so that a securing screw 29 can be screw-engaged in the threaded hole 26d. The first screw shaft 26 can be secured to the core shaft 25 by fastening the securing screw 29 in the threaded hole 26d to thereby restrict the relative rotation of the head portion 26c to the core shaft 25. The core shaft 25 has a drive gear 31 secured thereto in the vicinity of the driving unit mounting plate 24.

The second screw shaft 27 which is rotatably supported by the core shaft 25 is provided on one end thereof with a drive gear 30 secured thereto. The second screw shaft 27 abuts at the other end thereof against the end 26c of the first screw shaft 26 secured to the core shaft 25 to restrict the axial movement of the second screw shaft 27. Consequently, the first screw shaft 26 is rotatable together with the core shaft 25, and the second screw shaft 27 is relatively rotatable with respect to the core shaft 25 and the first screw shaft 26. Thus, the first and second screw shafts 26 and 27 are independently rotatable.

The second lens driving unit 13 and the third lens driving unit 15 are supported by the single driving unit mounting plate 24. The second lens driving unit 13 is provided with a reduction gear train 32, and a first drive motor 33 which transmits the rotation thereof to the reduction gear train 32. The third lens driving unit 15 is provided with a reduction gear train 35, and a second drive motor 34 which transmits the rotation thereof to the reduction gear train 35.

The reduction gear train 32 is connected to and associated with the drive gear 31 through a transmission gear 46 that protrudes forward in the optical axis direction from the driving unit mounting plate 24. The number of revolutions of the first and second drive motors 33 and 34 is detected by respective rotation detecting sensors 50 and 51, so that the rotation of the drive motors 33 and 34 are controlled in accordance with the detection results.

The angle of the engagement of the pins 41 with respect to the lead angle of the lead screw 22 in the feed screw mechanism and the an engagement adjusting apparatus which adjusts the position of the needles 41 in a direction perpendicular to the axis of the lead screw 22 will be discussed below.

The linearly movable members 36 and 37 have supporting portions 38 which support the needle supporting plates 42 which can be secured to the supporting portions 38 by mounting screws (and locking means) 40. When the mounting screws 40 are loosened, the pin supporting plates 42 can be rotated relative to the supporting portions 38 to thereby adjust the angular position thereof relative to the supporting portions 38, so that the pins 41 can be adjusted to meet the lead angle of the screw shafts 26 and 27 (i.e., the angle defined by a plane normal to the longitudinal axis thereof and the spiral grooves of the male screw portions 26b and 27b).

Each of the pin supporting plates 42 is substantially rectangular in plan view, with a raised portion C located at the center portion thereof, as can be seen in FIGS. 2 through 7. The raised portion C is provided with a center opening 42d, a pair of convex portions 42a and a pair of concave portions 42b, on both sides of the center opening 42d. There are slits or cut-away portions 42e between the convex portions 42a and the corresponding concave portions 42b whose height is smaller than the height of the convex portions 42a. Consequently, spaces "s" (FIG. 6) in which the opposed ends of the needle 41 are inserted occur between each pair of convex and concave portions 42a and 42b. Hence, the pins 41 are held in the spaces "s" on the opposed sides of the center openings 42d at the tops of the raised portions C, so that the pins 41 can be firmly held by the pin supporting plates 42.

Figure 7:
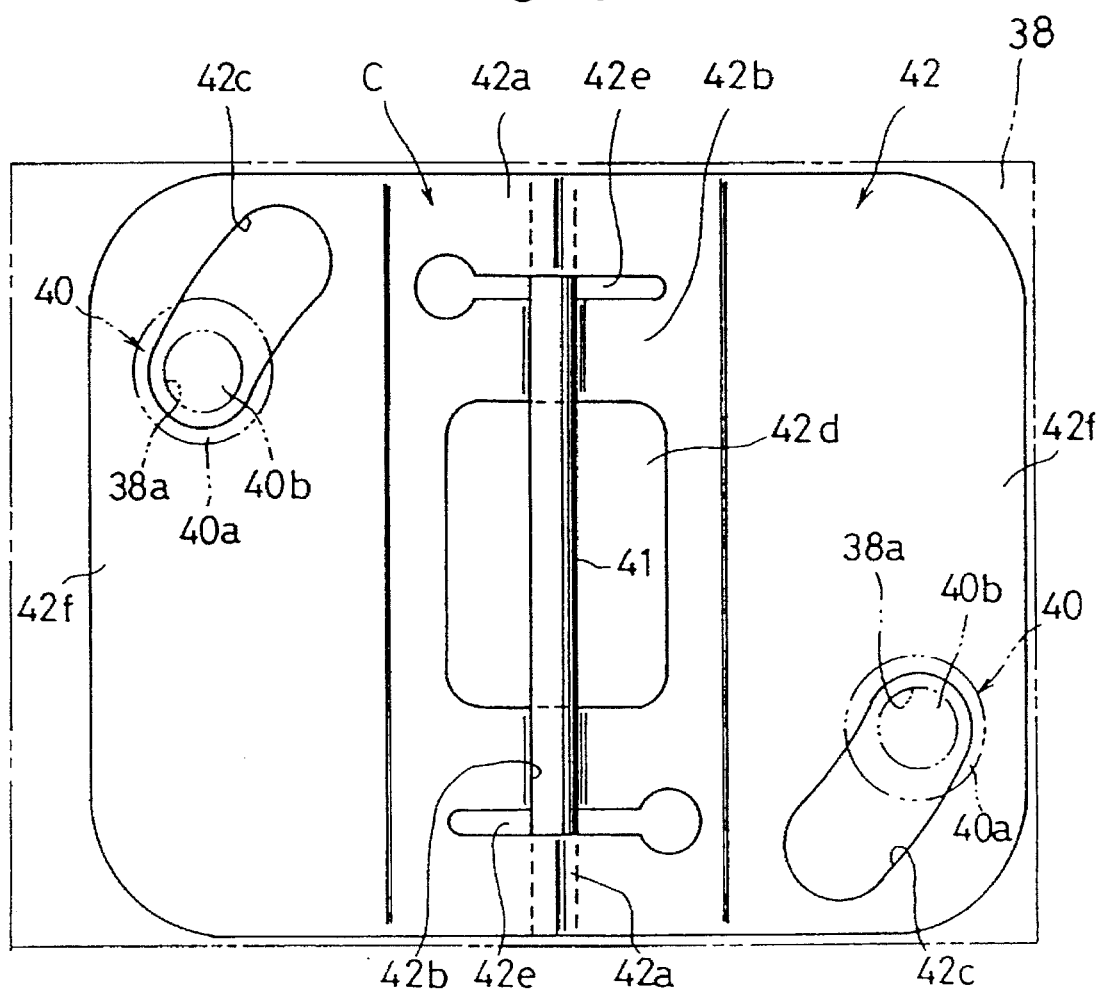
FIG. 7 is a plan view of a pin supporting plate on which a pin is held.

Each of the pin supporting plates 42 is provided with a pair of planar surface portions 42f connected to the raised portion C on the right and left sides of the raised portion C in FIG. 7. The planar surface portions 42f are provided with a pair of curved slots 42c that are located in a rotation-symmetry arrangement with respect to the longitudinal center axis of the raised portion C. The curved slots 42c extend along a circle whose center is located at the center of the rotation-symmetry. When the raised portions C of the pin supporting plates 42 which are flexible due to the shape thereof are elastically deformed in the direction indicated at arrows "A" in FIG. 6, the height of the raised portions "C" in the direction indicated at "B" in FIG. 6 can be adjusted with respect to the reference surface defined by the planar surface portions 42f. Furthermore, each of the mounting screws 40 is provided with a threaded portion (male screw portion) 40b whose diameter is smaller than the width of the elongated holes 42c, and a head portion 40a whose diameter is larger than the width of the elongated holes 42c, as shown in FIG. 7. The supporting portions 38 are each provided with threaded holes 38a corresponding to the curved slots 42c of the pin supporting plates 42.

Figure 8:
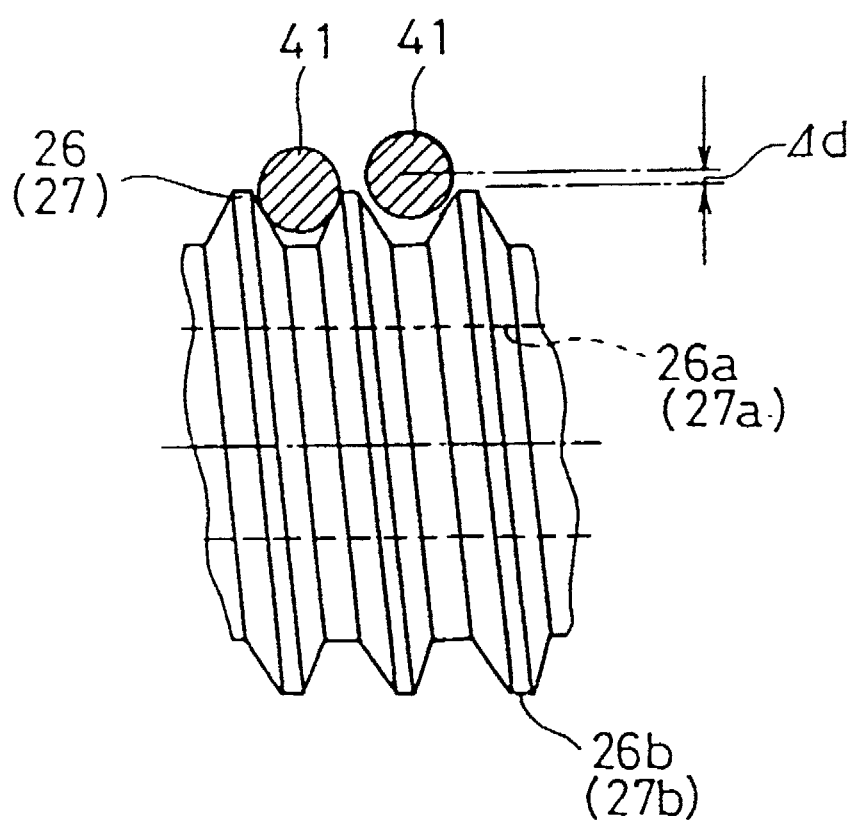
FIG. 8 is a front elevational view of a pin which engages with a first or second screw shaft.

Consequently, when the mounting screws 40 are inserted in the curved slots 42c of the supporting plates 42 and are screwed in to the corresponding threaded holes 38a and fastened, after the positional adjustment of the pin supporting plates 42 is carried out, by the angular displacement of the pin supporting plates 42, the pin 41 are rotated and adjusted within the plane of the pins 41. Moreover, by deflecting or deforming the pin supporting plates 42 in the direction "A" (FIG. 6), the pins 41 are displaced by a desired amount of displacement (e.g., Δ d in FIG. 8) in a direction perpendicular to the axis of the lead screw 22.

Thus, the pins 41 can be secured to the respective linearly movable members 36 and 37 in the state that the needles meet the lead angle of the lead screw 22, i.e., the male screw portions 26b and 27b and correctly engages with the spiral grooves of the male screw portions 26b and 27b, after the pins 41 are rotated and adjusted in a plane including the same and adjusted in the direction perpendicular to the axis of the lead screw 22.

The camera 11 as constructed above operates as follows.

When the first drive motor 33 and the second drive motor 34 are rotated upon photographing, the rotation reduced by the reduction gear train 32 is transmitted to the drive gear 31 through the transmission gear 46 to rotate the first screw shaft 26 through the core shaft 25. As a result, the linearly movable member 36 having the first screw shaft 26 engaged by the pins 41 is moved forward or rearward in the optical axis direction in accordance with the lead of the first screw shaft 26.

The rotation of the drive motors reduced by the reduction gear train 35 is transmitted to the drive gear 30 through the transmission gear 49 to rotate the second screw shaft 27. As a result, the linearly movable member 37 having the second screw shaft 27 engaged by the needle 41 is moved forward or rearward in the optical axis direction in accordance with the lead of the second screw shaft 27. It should be appreciated here that the needles 41 are supported at the opposed ends thereof, and accordingly, a more rigid or steady support than a cantilever type support can be established. This ensures a reliable and correct engagement of the needles with the male screw portions 26b and 27b.

The zooming operation is effected by the movement of the second and third lens groups L2 and L3 supported by the linearly movable members 36 and 37 in the optical axis direction while keeping a predetermined relationship therebetween. Upon zooming, the second and third lens groups L2 and L3 are moved either simultaneously or successively in the optical axis direction by the simultaneous operation or successive operations of the first and second drive motors 33 and 34.

Upon completion of the zooming, the first drive motor 33 is driven at an appropriate time to move the second lens group L2 through the first screw shaft 26 in the optical axis direction by a predetermined displacement to thereby effect the focusing operation. If focusing data is obtained during the zooming operation, it is possible to move the second lens group 12 by a value obtained by subtracting necessary position (focusing data) for the focusing from the actual position (zooming data), to thereby simultaneously execute both the zooming and the focusing. This focusing and zooming data comes from the light transmitted through the first, second and third lens groups L1, L2 and L3 and incident upon a light receiving means 9, such as a CCD, etc. (FIG. 1).

The adjustment of the angle of engagement of the pin 41 with respect to the lead angle of the first screw shaft 26 (second screw shaft 27) and the adjustment of the position of the pin 41 in a direction perpendicular to the axis of the lead screw 22 are carried out as follows.

First, the mounting screws 40 screwed in the supporting portions 38 are loosened to allow the pins supporting plates 42 to be moved with respect to the supporting portions 38. Thereafter, the raised portion "C" is grasped or held by an operator to move the pin 41 in the direction "B" in FIG. 6. In this state, the operator rotates the needle supporting plate 42 in a predetermined direction while maintaining an appropriate position of the pin with respect to the spiral grooves of the male screw portion 26b (27b). As a result of the rotation of the pin supporting plate 42, the mounting screws 40 are fastened to secure the pin supporting plate 42 to the supporting portion 38, in such a state that the engagement angle of the pin 41 meets the lead angle of the first screw shaft 26 or second screw shaft 27.

Consequently, the angle of engagement of the needle 41 with respect to the lead angle of the first screw shaft 26 or second screw shaft 27, and the position of the pin 41 in the direction perpendicular to the axis of the lead screw 22 are correctly adjusted, so that a failure to engage the pin with the pin screw due to an oscillation or applied shock is prevented.

When the adjustment of the engagement of the pins 41 is effected by the adjusting apparatus, the pins 41 are correctly and appropriately brought into engagement with the spiral grooves of the male screw portion 26b (27b), and accordingly, the backlash can be eliminated or reduced. Consequently, the forward or rearward displacement of the second lens group L2 or third lens group L3 precisely corresponds to the rotation of the first screw shaft 26 or second screw shaft 27, takes place in the optical axis direction.

As can be understood from the above discussion, according to the present invention, since the engagement of the needles with the lead screw can be easily and correctly adjusted, no skip of the needle over the teeth of the screw shaft due to an error in the engagement occurs.

The following discussion will be addressed to a second embodiment of the present invention.

Figure 9:
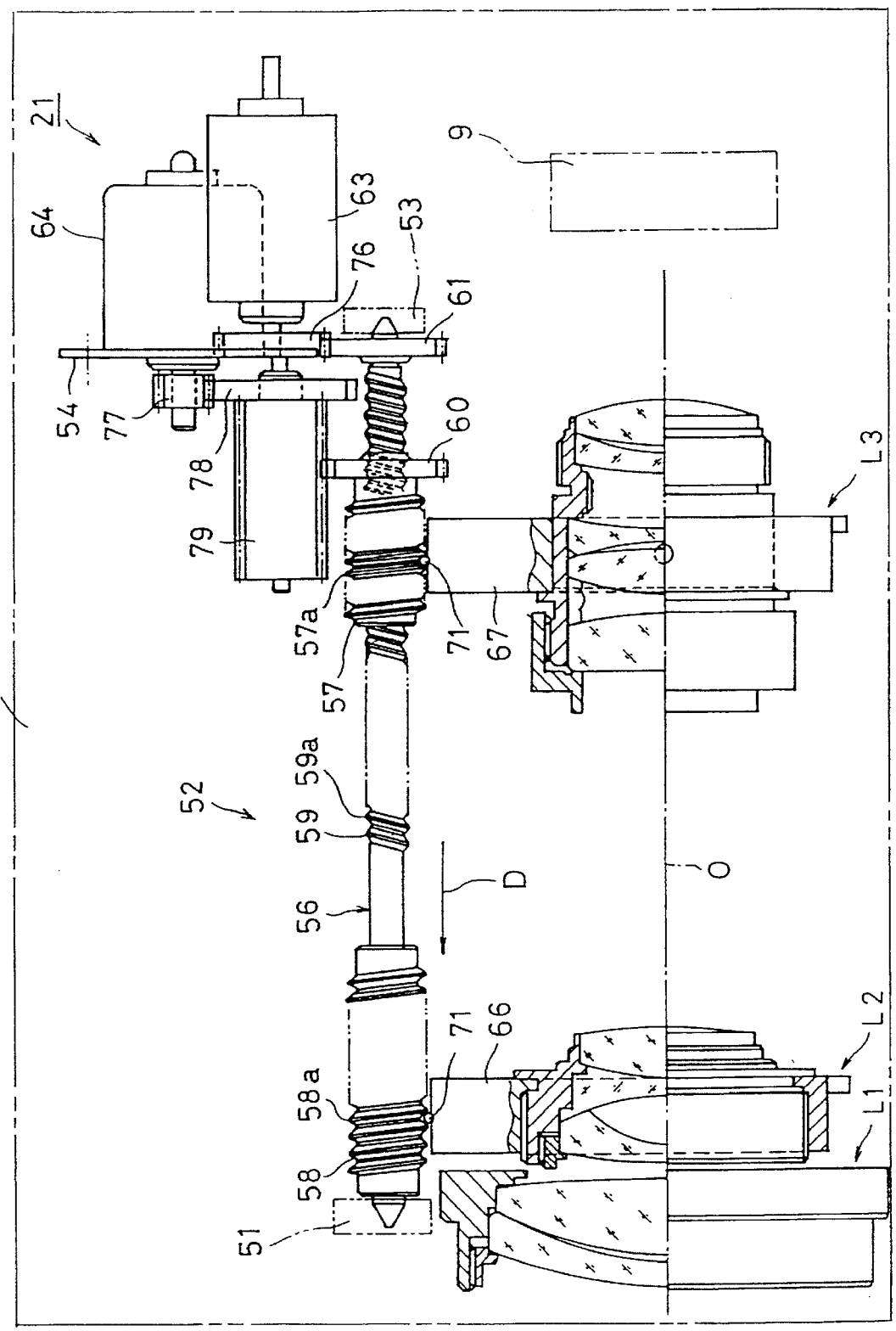
FIG. 9 is a plan view of the main components of a camera to which a feed screw mechanism is applied, according to the second embodiment of the present invention.
Figure 10:
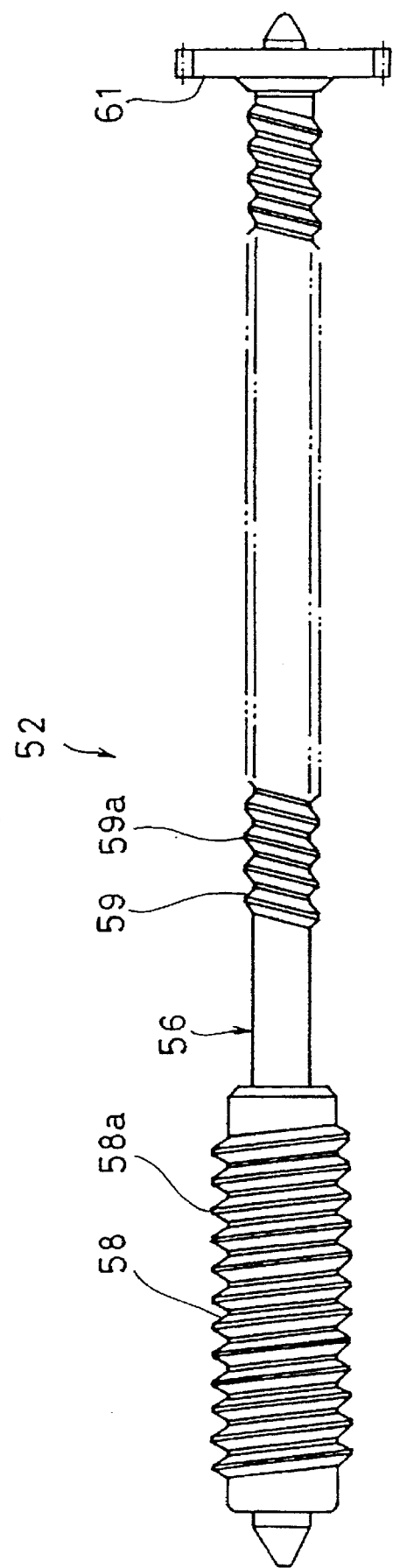
FIG. 10 is an enlarged front elevational view of a first screw shaft of a feed screw mechanism shown in FIG. 9.
Figure 11:
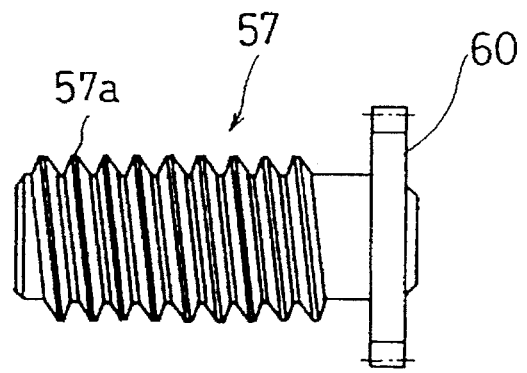
FIG. 11 is an enlarged front elevational view of a second screw shaft of a feed screw mechanism shown in FIG. 9.
Figure 12:
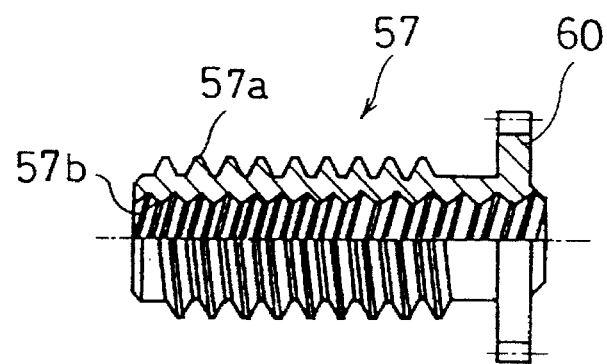
FIG. 12 is a partially sectioned front elevational view of a second screw shaft shown in FIG. 11.

As shown in FIG. 9, a camera 21 to which a feed screw 1 mechanism according to the present invention is applied is provided with a first lens group L1, a second lens group L2, and a third lens group L3, on a base 10. The first lens group L1 is secured to the base 10. The second and third lens groups L2 and L3 are supported so as to move in the direction of the optical axis O while keeping a predetermined relationship therebetween, so that a zooming operation is carried out by the relative movement of the second and third lens groups L2 and L3. The third lens group L3 is moved in the optical axis direction to effect the focusing. The base 10 is provided thereon with a first drive motor 63 which moves the second lens group L2 in the optical axis direction O, a second drive motor 64 which moves the third lens group L3 in the optical axis direction O, and a light receiving portion 9, such as a CCD, on which light transmitted through the first, second and third lens groups L1, L2 and L3 is made incident.

The feed screw mechanism is provided, on the base 10, with a lead screw 52 extending in parallel with the optical axis O, pins 71 which are engaged by the lead screw 22, and linearly movable members 66 and 67 which respectively support the second and third lens groups L2 and L3. The feed screw mechanism converts the rotational movement of the lead screw 52 to a linear movement through the pins 71 to move the second and third lens groups L2 and L3 in the optical axis direction. The lead screw 52 is comprised of a first screw shaft 56 and a second screw shaft 57.

The first screw shaft 56 is rotatably supported at the front and rear ends thereof, by supporting members 51 and 53 so as not to allow movement in the optical axis direction. The first screw shaft 56 is also provided with a large diameter screw thread 58 at one end, with an axis which travels a substantial in the optical axis direction, a small diameter screw thread 59 length of the first screw shaft 56 to one end, and a drive gear 61 secured to on end of the first second shaft 56.

The direction of the thread of the large diameter screw 58 is opposite to that of the small diameter screw 59. In the illustrated embodiment, the large diameter screw 58 is a right-hand screw so that when the large diameter screw 58 is rotated in the clockwise direction as viewed in the direction D in FIG. 9, the forward movement (left direction in FIG. 9) thereof occurs, and the small diameter screw 59 is a lefthand screw so that when the small diameter screw 59 is rotated in the clockwise direction as viewed in the direction D, the rearward movement (right direction in FIG. 9) thereof occurs, respectively. The pitch P1 (FIG. 14) of the small diameter screw 59 is larger than the pitch P2 of the male screw portion 57a of the second screw shaft 57.

The second screw shaft 57 is hollow and is provided on the outer and inner peripheral surfaces thereof with a threaded portion (the male screw portion 57a) whose pitch is identical to the pitch of the male screw portion 58a of the large diameter screw 58 and a threaded portion (female screw portion 56b) whose pitch is identical to the pitch of the male screw portion 59a, respectively. The male screw portion 59a of the small diameter screw 59 is screw-engaged in the female screw portion 67b. The second screw shaft 57 is provided on the rear end thereof with a drive gear 60 secured thereto, which is in mesh with the transmission gear 79, so that the rotation is transmitted from the transmission gear 79 thereto. The transmission gear 79 projects far enough in the optical axis direction to ensure the engagement of the drive gear 60 therewith which moved in the optical axis direction. For multiple start threads the pitch is given by (lead/number of multiple thread starts, and in the illustrated embodiment, the lead is identical to one pitch, since all the screw portions of the lead screw 52 are of one thread screw (single-start screw).

The feed screw mechanism includes the first and second drive motors 63 and 64 as a driving means which independently rotates the first and second screw shafts 56 and 57. The first drive motor 63 transmits the rotation thereof to the drive gear 61 through the transmission gear 76 to rotate the first screw shaft 56 in the forward direction or reverse direction. The second drive motor 64 transmits the rotation thereof to the drive gear 60 through a pinion 77 and transmission gears 78 and 79 to rotate the second screw shaft 56 in the forward direction or reverse direction. The number of revolution of the first and second drive motors 63 and 64 are detected by respective rotation detecting sensors (not shown) provided at the rear ends of the drive shafts thereof, so that the drive thereof is controlled in accordance with the detection results.

The linearly movable member 66 has a pin 71 which is in mesh with the large diameter screw 58 of the first screw shaft 56, and the linearly movable member 67 has a pin 71 which is in mesh with the second screw shaft 57. The linearly movable members 66 and 67 respectively support the second and third lens groups L2 and L3, so that when the screw shafts 56 and 57 are rotated by the first and second drive motors 63 and 64, the linearly movable members 66 and 67 are independently moved in the optical axis direction through the pins 71.

The camera 21 as constructed above operates as follows.

When the first drive motor 63 and the second drive motor 64 are respectively rotated upon zooming/focusing, the first screw shaft 56 is rotated through the transmission gear 76 and the drive gear 61, and the second screw shaft 57 is rotated through the pinion 77, the transmission gears 78 and 79, and the drive gear 61, respectively.

As a result, the linearly movable member 66 having the large diameter screw 58 engaged by the pin 71 is moved forward or rearward in the optical axis direction in accordance with the lead of the large diameter screw 58. The linearly movable member 67 having the second screw shaft 57 engaged by the needle 71 is moved forward or rearward in the optical axis direction in accordance with the lead of the screw shaft 57.

The zooming operation is effected by the movement of the second and third lens groups L2 and L3 supported by the linearly movable members 66 and 67 in the optical axis direction while keeping a predetermined relationship therebetween. Upon zooming, the second and third lens groups L2 and L3 are moved either simultaneously or successively in the optical axis direction by the simultaneous operation or successive operations of the first and second drive motors 63 and 64.

Figure 14:
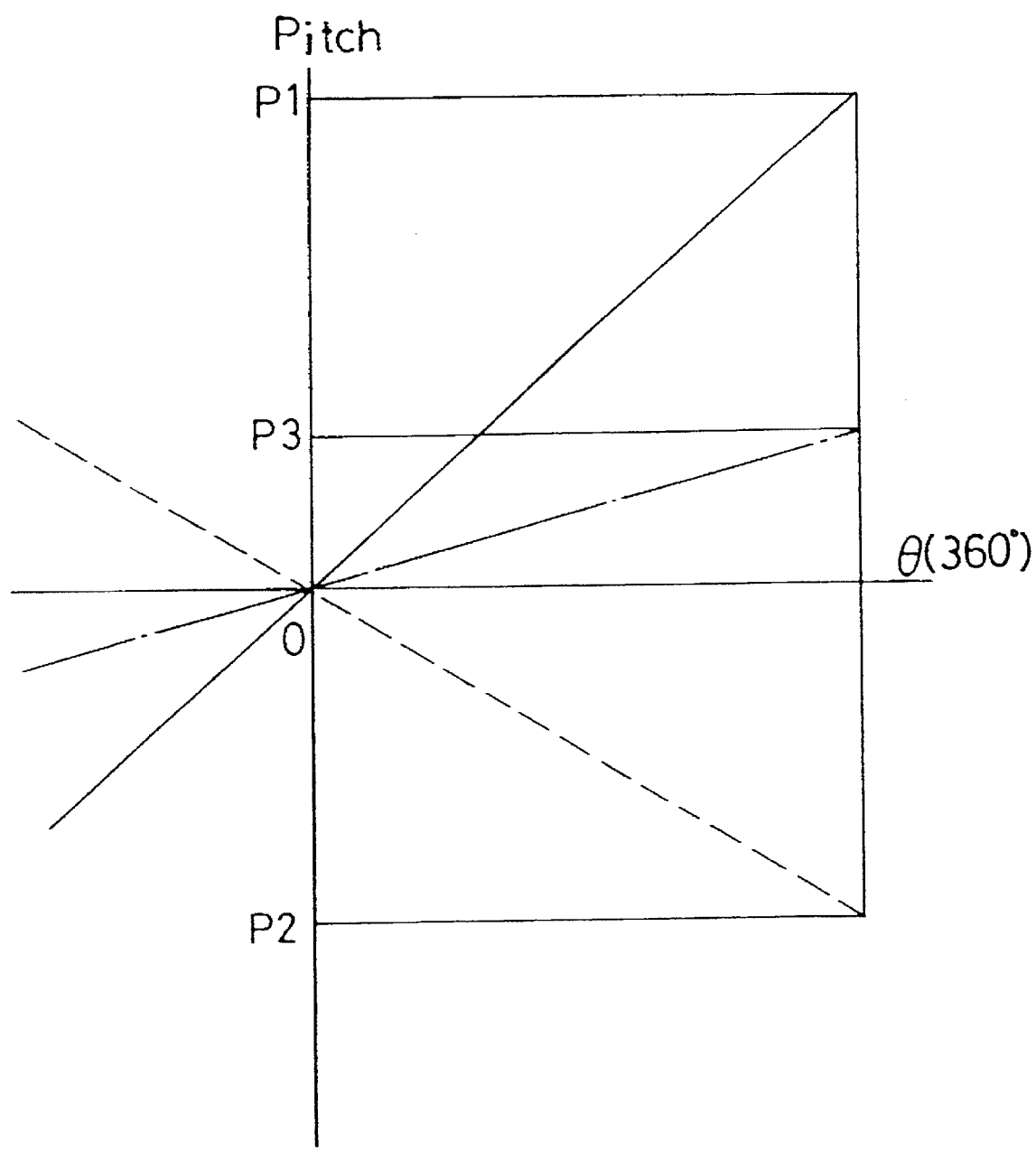

Upon completion of the zooming, the second drive motor 64 is driven at an appropriate time to move the third lens group L3 in the optical axis direction by the rotation of the second screw shaft 57 to thereby effect the focusing operation. It should be appreciated that since the pitch P1 of the small diameter screw 59 is larger than the pitch P2 of the male screw portion 57a (P1<P1), as mentioned above, for example when one rotation (rotation angle θ=360°) of the small diameter screw 59 takes place, a third pitch P3 represented by a difference between the pitches P1 and P2, i.e., (P1–P2) is obtained by one rotation of the second screw shaft 57 in the reverse direction (FIG. 14). Therefore, it is possible to more precisely control the linearly movable member 67 (and accordingly the third lens group L3) at a fine pitch smaller than the pitch P2 of the second screw shaft 57. Light transmitted through the first, second and third lens groups L1, L2 and L3 is incident upon the light receiving means 9, such as a CCD, etc. (FIG. 9).

To effect the focusing after the zooming is completed, the second lens group L2 which has completed the zooming is moved in the optical axis direction by the large diameter screw 58 which rotates together with the second screw shaft 57. In the second embodiment, correction data is calculated by a microcomputer or the like, based on focusing data, so that the large diameter screw 58 can be rotated in accordance with the correction data to return the second lens group L2 at a zooming completion position in which the zooming is completed.

In the feed screw mechanism according to the second embodiment, as mentioned above, since the third fine pitch P3 obtained by the difference in pitch between the small diameter screw 59 and the second screw shaft 57 is utilized, it is not necessary to reduce the pitch P2 of the male screw portion 57a, per se. Consequently, no tooth skip which tends to occur particularly when the pin 71 of the linearly movable member 67 is engaged by a screw having a fine pitch takes place. If focusing data is obtained during the zooming operation, it is possible to move the third lens group L3 by a value obtained by subtracting the displacement (focusing data) necessary for the focusing from the displacement (zooming data) necessary for the zooming to thereby simultaneously execute both the zooming and the focusing.

As mentioned above, in the feed screw mechanism applied to the camera 21, the first screw shaft 56 which constitutes the lead screw 52 is provided with the large diameter screw 58 and the small diameter screw 59 located at different axial positions, and the small diameter screw 59 is screw-engaged by the second screw shaft 57 which is provided on the outer peripheral surface thereof with the male screw portion 57a. Furthermore, the pins 71 of the linearly movable members 66 and 67 are respectively engaged by the large diameter screw 58 and the second screw shaft 57, so that the linearly movable members 66 and 67 are individually moved in the optical axis direction by the rotation of the screw shafts 58 and 57. Consequently, not only can the screw shafts 58 and 57 be compactly arranged, saving the space therefor, but also many components are made compatible, thus resulting in a reduced number of the components. As a result, the structure of the driving mechanism can be simplified so as to realize a compact camera.

Figure 13:
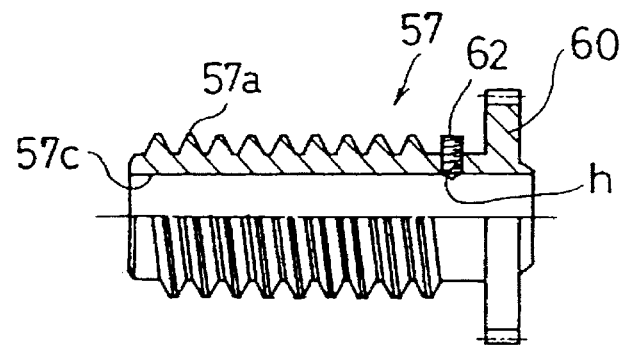
FIG. 13 is a partially sectioned front elevational view of an embodiment of a second screw shaft; and, FIG. 14 is a diagram of a pitch of a small diameter screw and a pitch of a second screw shaft.

Although the female screw portion 57b is formed on the inner peripheral surface of the second screw shaft 57 to be engaged by the small diameter screw 59 in the second embodiment, the second screw shaft 57 can be constructed as shown in FIG. 13. Namely, in FIG. 13, the second hollow screw shaft 57 has an axial hole 57c with no thread, whose inner diameter is substantially identical to the outer diameter of the small diameter screw 59. The screw shaft 57 is also provided, on the outer peripheral surface thereof, with a cross threaded hole h in which an engaging screw 62 is screwed. After the small diameter screw 59 is fitted in the second screw shaft 57, the engaging screw 62 is screwed in the threaded hole h so as to project at the inner end thereof into the axial hole 57c, so that the inner end of the engaging screw 62 can be engaged by the male screw portion 59a of the small diameter screw 59. Hence, the engaging screw 62 constitutes a female screw for the male screw portion 59a of the small diameter screw 59. With this structure, a simpler second screw shaft 57 can be obtained.

As can be understood from the above discussion, according to the present invention, a simple feed screw mechanism having fewer components than conventional devices can be provided. Moreover, since a fine pitch can be obtained, based on a difference in pitch between the first screw shaft and the second screw shaft, no tooth skip which tends to occur when the needle is engaged by the screw having a fine pitch takes place.

Although the invention has been described with reference to particular means, materials and embodiments, it is to be understood that the invention is not limited to the particulars disclosed and extends to all equivalents within the scope of the claims.

I claim:

1. A feed screw mechanism comprising:
    a linearly movable member having a pin; and,
    a lead screw shaft which is in mesh with said pin, so that a rotation of said lead screw shaft causes said linearly movable member to linearly move along a direction of an axis of said lead screw;
    said linearly movable member further comprising:
        a linear movement adjusting means for adjustably supporting said pin in a direction perpendicular to an axis of said lead screw shaft to adjust a distance between said pin and said lead screw shaft;
        a rotation adjusting means for rotatably supporting said pin in a plane including said pin to adjust the direction of said pin with respect to said lead screw shaft; and,
        a locking means for locking said pin at a predetermined position after said rotation adjustment of said pin.

2. A feed screw mechanism according to claim 1, wherein said linearly movable member supports a lens group so as to move said lens group in said optical axis direction of said lead screw shaft.

3. A feed screw mechanism according to claim 1, comprising a stationary lens group secured on a base of a feed screw mechanism, and a pair of movable lens groups which are independently movable in said optical axis direction with respect to the stationary lens group.

4. A feed screw mechanism according to claim 1, wherein said linear movement adjusting means comprises a pin supporting plate supported on a linearly movable member to support said pin.

5. A feed screw mechanism according to claim 4, wherein said pin supporting plate is provided with a pair of screw insertion holes.

6. A feed screw mechanism according to claim 5, wherein said locking means comprises of a plurality of mounting screws which can be inserted in a plurality of matching screw insertion holes of said pin supporting plate.

7. A feed screw mechanism according to claim 6, wherein said linearly movable member comprises a supporting portion, and wherein said pin supporting plate is provided with a reference surface against which a supporting portion of said linearly movable member abuts, and a deformable raised portion whose height from a reference surface can be varied by the deforming said raised portion, so that said pin can be held on and by the top of said raised portion.

8. A feed screw mechanism according to claim 7, wherein said screw insertion holes has a width larger than the diameter of a threaded portion of said mounting screws and smaller than a diameter of the head portions of said mounting screws, so that said reference surface can be displaced when said raised portion is deformed to vary said height thereof with respect to said reference surface.

9. A feed screw mechanism according to claim 8, wherein said mounting screws constitute said linear movement adjusting means together with said pin supporting plate, so that when said mounting screws, inserted in said screw insertion holes are loosened, said pin can be moved in a direction perpendicular to an axis of said lead screw, and when said mounting screws are fastened, said pin can be locked at an adjusted position.

10. A feed screw mechanism according to claim 1, wherein said rotation adjusting means comprises a needle supporting plate supported on and by said linearly movable member to support said pin.

11. A feed screw mechanism according to claim 10, wherein said pin supporting plate is provided with a pair of curved slots arranged in a rotation-symmetry and having centers located at a center of said rotation-symmetry.

12. A feed screw mechanism according to claim 11, wherein said locking means comprises mounting screws which are inserted in said curved slots.

13. A feed screw mechanism according to claim 12, wherein said pin supporting plate supports the needle in a vicinity of said center of rotation symmetry, so that when said pin supporting plate rotates about said center of rotation symmetry, said pin is rotated within a plane of said pin to thereby adjust the angle of engagement of said pin with respect to a lead angle of said lead screw.

14. A feed screw mechanism comprising;
   a first screw shaft including a pair of male screw portions at different positions in the axial direction thereof;
   a second screw shaft which is coaxially screw-engaged with one of said male screw portions of said first screw shaft, said second screw shaft being provided on a outer peripheral surface thereof with a male screw portion;
   linearly movable members which are respectively engaged with said first and second screw shafts so that said linearly movable members independently and linearly move by a rotation of said respective screw shafts; and,
   A drive means for respectively rotating said first and second screw shafts.

15. A feed screw mechanism according to claim 14, wherein said male screw portions of said first screw shaft have different diameters of screws, and a second screw shaft is engaged by the small diameter screw.

16. A feed screw mechanism according to claim 15, wherein said male screw portions of said first screw shaft have different directions of threads.

17. A feed screw mechanism according to claim 15, wherein a pitch of said small diameter screw of said first screw shaft is larger than a pitch of said male screw portion of said second screw shaft, so that when said second screw shaft is rotated in a direction opposite to a direction of a rotation of said small diameter screw of said first screw shaft, said linearly movable member that engages with said second screw shaft can be moved at a pitch different from, a pitch of said small diameter screw of the first screw shaft and a pitch of said male screw portion of the second screw shaft.

18. A feed screw mechanism according to claim 14, wherein said second screw shaft is provided with a threaded axial hole in which said male screw portion of said first screw shaft is screw-engaged.

19. A feed screw mechanism according to claim 14, wherein said second screw shaft is provided with an axial hole with a threaded cross hole in which an engaging screw is screw engaged to project into an axial hole to thereby engage with said male screw portion of said first screw shaft.

20. A zoom lens driving mechanism comprising:
   a pair of linearly movable members, each said linearly movable member having a pin;
   a pair of variable power lens groups of said zoom lens which are provided on each said linearly movable members;
   a pair of lead screw shafts which are respectively in mesh with said respective pin provided on said pair of linearly movable members, so that rotation of each said lead screw shafts causes linearly movable members to linearly move along a direction of an axis of said lead screw shaft, and
   a pair of driving sources for respectively rotating each of said lead screw shaft independently;
   each said linearly movable member further comprising:
      a linear movement adjusting means for adjustably supporting said pin in a direction perpendicular to an axis of said lead screw shaft to adjust a distance between said pin and said lead screw;
      a rotation adjusting means for rotatably supporting said pin in a plane including the same to adjust the direction of said pin with respect to said lead screw; and,
      a locking means for locking said pin at a predetermined position after said rotation adjustment of said pin.

21. A zoom lens driving mechanism comprising:
   a first screw shaft including a pair of male screw portions at different positions in the axial direction thereof;
   a second screw shaft which is coaxially screw-engaged with one of said male screw portions of said first screw shaft, said second screw shaft being provided on an outer peripheral surface thereof with a male screw portion;
   linearly movable members which are respectively engaged with said first and second screw shafts so that said linearly movable members independently and linearly move by rotation of said respective screw shafts;
   a pair of variable power lens groups of said zoom lens which are provided on each said linearly movable members; and,
   a drive means for respectively rotating said first and second screw shafts.

* * * * *